A. McMAHON.
PEA HARVESTER.
APPLICATION FILED OCT. 14, 1908.

936,733.

Patented Oct. 12, 1909.
2 SHEETS—SHEET 1.

Witnesses
Frank B. Hoffman

Inventor
Allen McMahon
By Victor J. Evans
Attorney

A. McMAHON.
PEA HARVESTER.
APPLICATION FILED OCT. 14, 1908.

936,733.

Patented Oct. 12, 1909.

2 SHEETS—SHEET 2.

Witnesses
Frank B. Hoffman

Inventor
Allen McMahon
By Victor J. Evans
Attorney

UNITED STATES PATENT OFFICE.

ALLEN McMAHON, OF SURING, WISCONSIN.

PEA-HARVESTER.

936,733.  Specification of Letters Patent.  Patented Oct. 12, 1909.

Application filed October 14, 1908. Serial No. 457,674.

*To all whom it may concern:*

Be it known that I, ALLEN MCMAHON, a citizen of the United States, residing at Suring, in the county of Oconto and State of Wisconsin, have invented new and useful Improvements in Pea-Harvesters, of which the following is a specification.

This invention relates to harvesters, and more particularly to those adapted for use in harvesting peas, and has for an object to provide a device of this character that can be easily and accurately attached to a mower, thus making it possible to cut around a field.

A further object of this invention is to provide a machine of the above described character that will effectively grasp the pea vines, straighten the same and bring them into position to be cut by the sickle knives without loss of the pods.

A further object of this invention is to provide a harvester with means so that the vines can be effectively cut, and to provide an endless belt adapted to move the vines toward the cutting knives and afterward discharging them upon elements at the rear of the machine so that the said vines may be delivered finally in wind rows at one side.

A further object is to provide simple and effective means for adjusting the endless belt so that it may be moved quickly and conveniently into an inoperative position.

Other objects and advantages will be apparent as the nature of the invention is better set forth, and it will be understood that changes within the scope of the claims may be resorted to without departing from the spirit of the invention.

Figure 1:
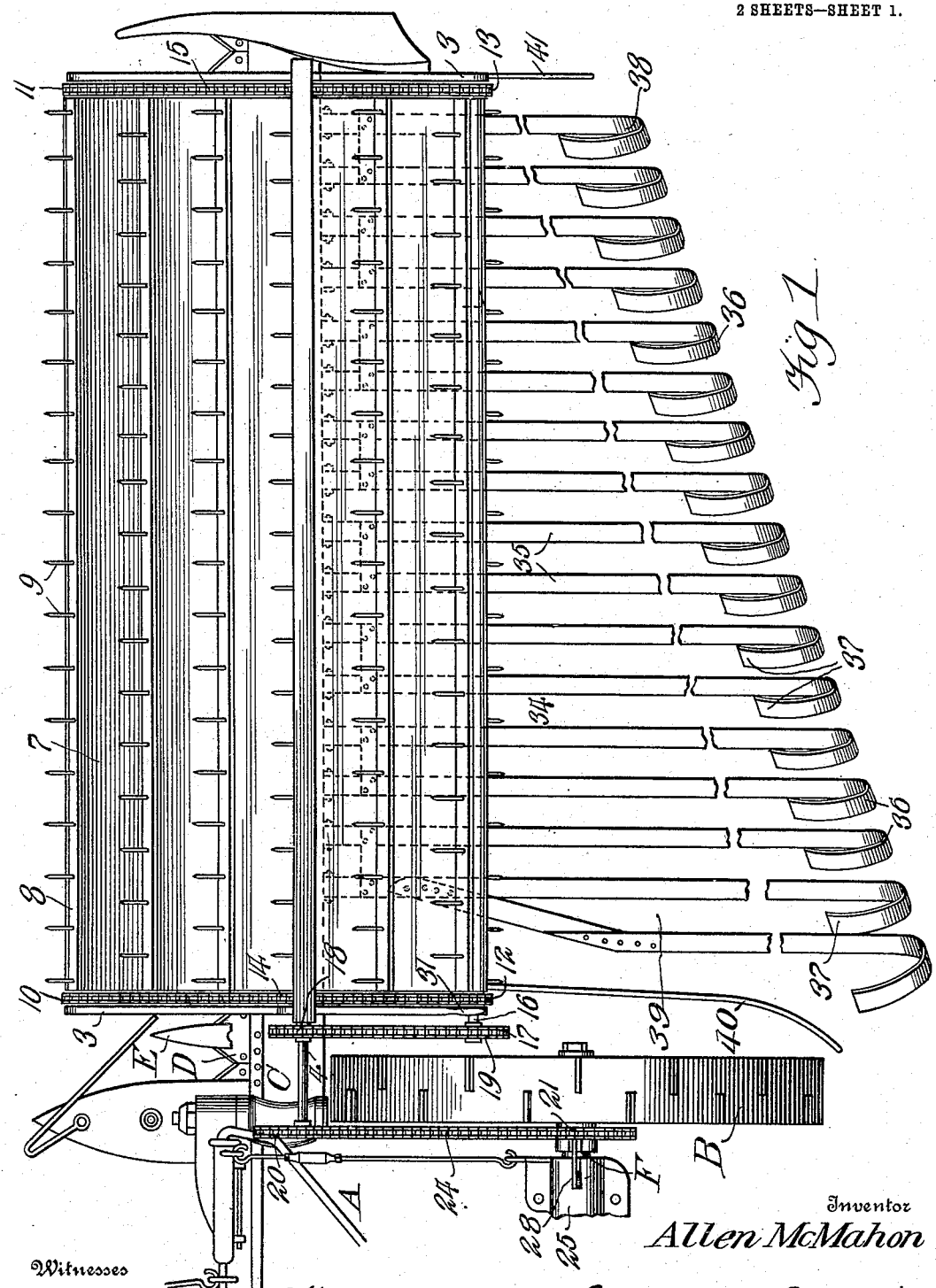
Figure 4:
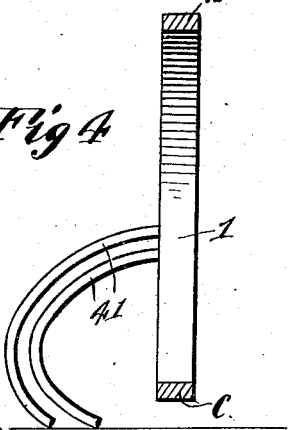
Figure 2:
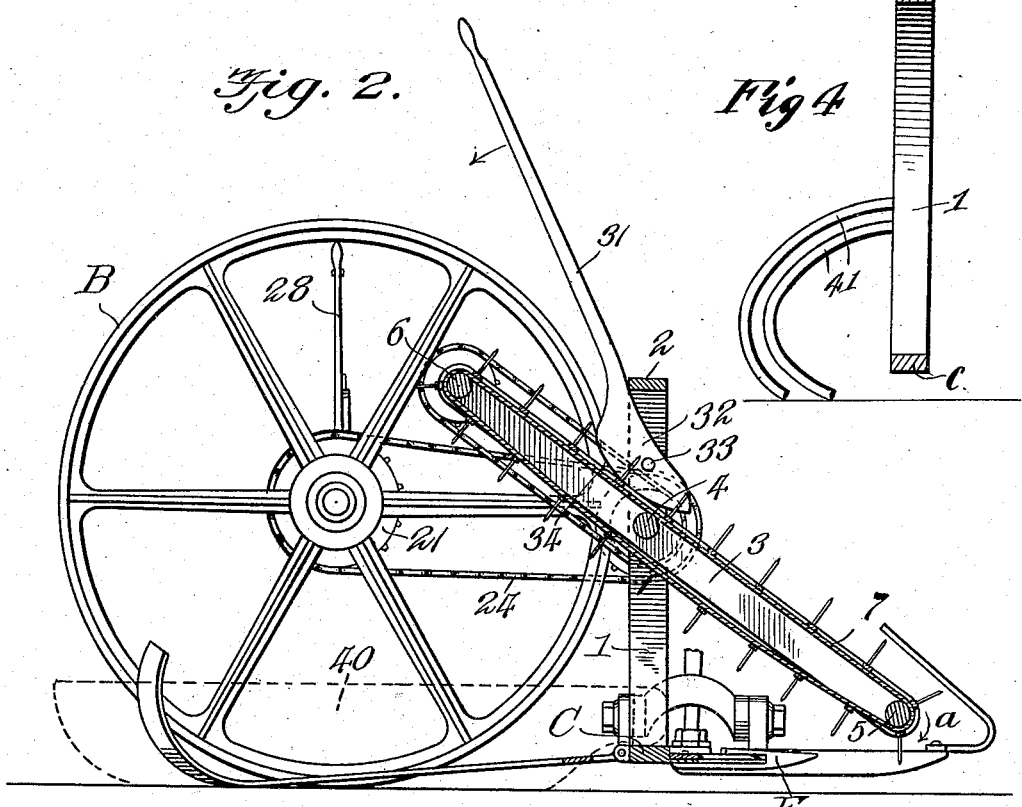
Figure 3:
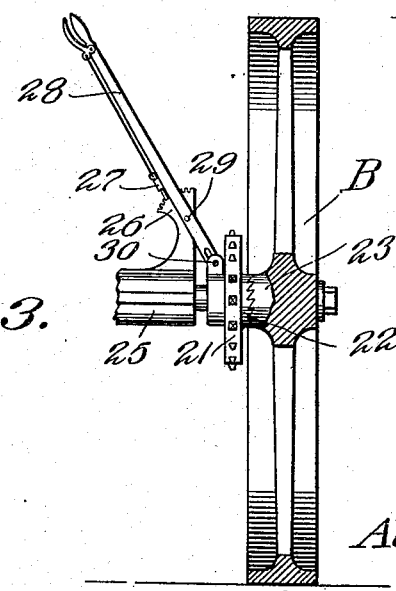

In the drawings, forming a portion of this specification and in which like characters of reference indicate similar parts in the several views:—Figure 1 is a top plan view of the harvester, Fig. 2 is a vertical section through the same, Fig. 3 is a vertical section through the master wheel showing the construction of the clutch elements. Fig. 4 is a fragmentary elevation of a portion of the machine showing the spring tines for imparting to the collector oscillatory movement.

Referring now more particularly to the drawings, there is shown a mower A of usual construction provided with a master wheel B, a finger bar C and cutting knives D which may be reciprocated in the usual manner and which operate in conjunction with the usual guide fingers E. A frame is mounted upon the finger bar C and comprises vertically disposed standards 1 located adjacent to the ends of the said bar, and at the upper ends the said standards are connected by a horizontally disposed brace bar or beam 2. Parallel bars 3 are pivotally mounted upon a shaft 4 journaled in the standards 1, and at the ends the said bars 3 are provided with horizontally disposed rollers 5 and 6. The rollers receive an endless belt 7 which is preferably formed from canvas or the like and which has secured thereto in any suitable manner a plurality of longitudinally extending parallel spaced slats 8. Each slat is provided with a plurality of fingers or teeth 9, the teeth of the slats being disposed alternately in alinement, or in other words the teeth of one slat are disposed between the teeth of the adjacent slats as will be readily understood upon reference to Fig. 1 of the drawings.

The roller 5 has secured thereto at its ends sprocket wheels 10 and 11, and the roller 6 has secured thereto sprocket wheels 12 and 13, the wheels 10 and 12 receiving a sprocket chain 14, and the wheels 11 and 13 receiving a sprocket chain 15. The chains 14 and 15 are preferably secured in a suitable manner to the ends of the belt 7 to provide a perfect operation of the said belt. The roller 6 is provided at one side with a stub axle 16 upon which is keyed a sprocket wheel 17. The shaft 4 extends outwardly of one of the bars 3 and has keyed thereto a sprocket wheel 18 located in line with the sprocket wheel 17, and the said wheels thus receive a sprocket chain 19. The shaft 4, outwardly of the sprocket wheel 18 has secured thereto a sprocket wheel 20, and the axle F upon which the master wheel B is mounted, is provided with a sliding sprocket wheel 21 having at one side a clutch element 22 adapted to co-engage a similar clutch element 23 upon the hub of the master wheel. The wheels 20 and 21 receive a drive chain 24. The axle F is provided with a bracket 25 having a vertically disposed rack element 26 to receive a pawl or dog 27 carried by a lever 28 pivotally mounted at 29 to the bar 26, and at the lower end the said lever is connected as shown at 30 to the sprocket wheel 21 so that it may be moved upon the shaft F to engage or disengage its clutch element 22 with the element 23.

It will be seen that the roller 5 is positioned normally or directly in front of the cutting knives D of the mower, and by the provision of the chain gearing as herein set forth and described, it is obvious that the belt 7 will travel in the direction of the arrow *a* when the mower is moved in a forward direction so that the pea vines will be collected by the fingers or teeth 9 and carried toward the rear of the machine so that they may be effectively cut by the knives D. One of the standards 1 is provided with a lever 31 having a head 32 pivotally mounted at 33 as shown in Fig. 2 of the drawings. The head 32 is of cam form and is provided with a curved surface 34 adapted to engage the upper edge of one of the bars 3. The construction of the bars 3 is such that they are pivotally mounted upon the shaft 4 somewhat eccentrically so that the belt lies normally in a diagonal position with the roller 5 at the lower end. When the lever 31 is moved in a rearward direction, as shown by the arrow in Fig. 2, it will be seen that the curved surface 34 of the head 32 will engage the upper edge of one of the bars 3 and bear against the same rearwardly of the shaft 4 so that the belt 7 may be effectively elevated or moved into an inoperative position.

The finger bar C is provided with a windrower 34 disposed rearwardly of the cutting knives D, and the said windrower comprises a plurality of spaced parallel bars 35, and the said bars are curved upwardly at their rear ends as indicated at 36 and inwardly as shown at 37. The bars 35 are each formed of a different length and are arranged in a manner so that a narrow throat 38 is provided at the right of the machine, and a broad throat 39 is formed at the left of the machine. After the pea vines have been collected by the belt 7 they will be cut by the knives D as previously described, and the said vines will be deposited upon the bars 35 forming the collector. It will be seen that the said vines will move upon the collector to be discharged from the throat 39 at the left of the machine and formed into wind rows where they may be collected. The frame of the machine adjacent to the master wheel B has secured thereto a guard 40 adapted to prevent the vines from coming in contact with the master wheel. To impart somewhat of a rolling motion to the peas upon the collector I provide the standard 1 at the right of the machine with a plurality of spring tines 41 which are similar in construction to rake teeth, and which are adapted to engage the ground to impart a vibratory movement to the collector.

From the construction herein set forth and described it will be seen and understood that I provide an extremely simple and inexpensive pea harvester which may be sold as an attachment to a mowing machine and placed upon the market at a relatively low figure. The construction is such that the pea vines are effectively straightened during the operation of the belt, and it is obvious that the said vines may be handled without injuring or breaking the pods.

It may be stated, that the spring tines 41, when the machine is traveling, engage the ground and slightly elevate the right hand portion of the machine, so that, incident to the vibratory movement imparted to the collector through the medium of said spring tines, the vines will effectively travel in one direction toward the discharge throat 39.

I claim:—

1. A machine of the class described comprising cutting mechanism, a frame, an endless belt carried by the frame for collecting vines and throwing them upon said mechanism, means for moving the belt into or out of operation, a collector at the rear of the mechanism, and ground engaging means upon the frame adapted to impart to the collector vibratory movement when the machine is in operation.

2. A machine of the class described comprising cutting mechanism, means for collecting vines and throwing them upon said mechanism, means for moving the belt into or out of operation, a collector at the rear of the cutting mechanism, and ground engaging means adapted to impart to the collector vibratory movement when the machine is in operation.

3. A machine of the class described comprising cutting mechanism, an endless belt for collecting vines and throwing them upon the cutting mechanism, means for moving the belt into or out of operation, a collector at the rear of the cutting mechanism, and spring means for engaging the ground when the machine is traveling to impart to the collector a vibratory movement.

4. A machine of the class described comprising cutting mechanism, a frame, an endless belt carried by the frame for collecting vines and throwing them upon the mechanism, means for moving the belt into or out of operation, a collector at the rear of the mechanism, and spring tines carried by the frame for engaging the ground when the machine is traveling to impart to the collector vibratory movement.

In testimony whereof I affix my signature in presence of two witnesses.

ALLEN McMAHON.

Witnesses:
NELLIE LORD BUTLER,
JENNIE R. SYLVESTER.